United States Patent
Smith (10) Patent No.: US 6,736,519 B2
(45) Date of Patent: *May 18, 2004

(54) PERFORATED RETROREFLECTIVE FILM (75) Inventor: Peter R. Smith, Avon, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/254,957

(22) Filed: Sep. 25, 2002

(65) Prior Publication Data

US 2003/0021030 A1 Jan. 30, 2003

Related U.S. Application Data (63) Continuation of application No. 09/730,522, filed on Dec. 5, 2000, now Pat. No. 6,481,857, which is a continuation-in-part of application No. 09/211,962, filed on Dec. 15, 1998, now Pat. No. 6,155,689.
(60) Provisional application No. 60/069,818, filed on Dec. 16, 1997.

(51) Int. Cl.$^7$ ................................................ G02B 5/124
(52) U.S. Cl. .................... 359/530; 359/529; 428/137
(58) Field of Search ................... 359/529–533, 359/833–834; 428/156, 137, 913.3; 264/1.9

(56) References Cited

U.S. PATENT DOCUMENTS

| | | | |
|---|---|---|---|
| 3,684,348 A | 8/1972 | Rowland | 350/103 |
| 3,689,346 A | 9/1972 | Rowland | 156/245 |
| 3,712,706 A | 1/1973 | Stamm | 350/103 |
| 3,811,983 A | 5/1974 | Rowland | 156/245 |
| 3,830,682 A | 8/1974 | Rowland | 161/2 |
| 3,975,083 A | 8/1976 | Rowland | 350/103 |
| 4,103,060 A | 7/1978 | Bingham et al. | 428/241 |
| 4,332,847 A | 6/1982 | Rowland | 428/156 |
| 4,712,868 A | 12/1987 | Tung et al. | 350/105 |
| 4,769,265 A * | 9/1988 | Coburn | 428/40 |
| 4,801,193 A | 1/1989 | Martin | 350/103 |
| 5,202,168 A | 4/1993 | Turner et al. | 428/40 |
| 5,229,882 A | 7/1993 | Rowland | 359/530 |
| 5,236,751 A | 8/1993 | Martin et al. | 428/40 |
| 5,264,063 A * | 11/1993 | Martin | 359/530 |
| 5,376,431 A | 12/1994 | Rowland | 428/164 |
| 5,491,586 A | 2/1996 | Phillips | 359/530 |
| 5,512,219 A | 4/1996 | Rowland et al. | 264/1.6 |
| 5,525,177 A | 6/1996 | Ross | 156/240 |
| 5,550,346 A | 8/1996 | Andriash et al. | 219/121.72 |
| 5,558,740 A | 9/1996 | Bernard et al. | 156/231 |
| 5,592,330 A | 1/1997 | Bernard | 359/529 |
| 5,614,286 A | 3/1997 | Bacon et al. | 428/161 |
| 5,637,173 A | 6/1997 | Martin et al. | 156/235 |
| 5,642,222 A | 6/1997 | Phillips | 359/530 |

(List continued on next page.)

Primary Examiner—Drew Dunn
Assistant Examiner—Leo Boutsikaris
(74) Attorney, Agent, or Firm—Hamilton, Brook, Smith & Reynolds, P.C.

(57) ABSTRACT

A see-through retroreflective structure includes a transparent polymeric film, an array of retroreflective elements attached to the polymeric film, and an array of apertures through the retroreflective structure within the array of retroreflective elements. In one embodiment, the retroreflective structure includes a metalized reflective layer formed on the transparent prism elements and a support layer, such as a fabric, is attached to the metalized reflective layer.

The method includes providing a transparent polymeric film. An array of retroreflective elements is attached to the polymeric film. The array of retroreflective elements and the transparent polymeric film are perforated through the retroreflective structure to form an array of apertures, thereby forming a retroreflective structure. The apertures are of sufficient size and spacing to provide a see-through capability. In one embodiment, a metalized reflective layer can be applied to the retroreflective elements and a support layer, such as a fabric, is attached to the metalized reflective layer.

36 Claims, 11 Drawing Sheets

U.S. PATENT DOCUMENTS

| | | | |
|---|---|---|---|
| 5,679,435 A | 10/1997 | Andriash | 428/137 |
| 5,831,766 A * | 11/1998 | Martin | 359/529 |
| 5,900,978 A * | 5/1999 | Sagar | 359/536 |
| 5,925,437 A * | 7/1999 | Nelson | 428/137 |
| 5,939,168 A | 8/1999 | Andriash | 428/138 |
| 6,143,224 A * | 11/2000 | Bernard | 264/220 |
| 6,155,689 A * | 12/2000 | Smith | 359/530 |

\* cited by examiner

PERFORATED RETROREFLECTIVE FILM

RELATED APPLICATIONS

This application is a Continuation Application of U.S. application Ser. No. 09/730,522, filed on Dec. 5, 2000 (now U.S. Pat. No. 6,481,857), which is a Continuation-in-Part Application of U.S. application Ser. No. 09/211,962, filed on Dec. 15, 1998 (now U.S. Pat. No. 6,155,689), which claims the benefit of U.S. Provisional Application No. 60/069,818, filed on Dec. 16, 1997. The contents of each application are incorporated herein by reference in their entirety.

BACKGROUND OF THE INVENTION

Retroreflective materials are employed for various safety and decorative purposes. Particularly, these materials are useful at night time when visibility is important under low light conditions. With perfect retroreflective materials, light rays are reflected essentially towards a light source in a substantially parallel path along an axis of retroreflectivity.

Many types of retroreflective material exist for various purposes. These retroreflective materials can be used as reflective tapes and patches for clothing, such as vests and belts. Also, retroreflective materials can be used on posts, barrels, traffic cone collars, highway signs, warning reflectors, etc. Retroreflective material can be comprised of arrays of randomly oriented micron diameter spheres or close packed cube-corner (prismatic) arrays.

Cube-corner or prismatic retroreflectors are described in U.S. Pat. No. 3,712,706, issued to Stamm on Jan. 23, 1973, the teachings of which are incorporated by reference herein. Generally, the prisms are made by forming a master negative die on a flat surface of a metal plate or other suitable material. To form the cube-corners, three series of parallel equidistance intersecting V-shaped grooves 60 degrees apart are inscribed in the flat plate. The die is then used to process the desired cube-corner array into a rigid flat plastic surface.

Further details concerning the structures and operation of cube-corner microprisms can be found in U.S. Pat. No. 3,684,348, issued to Rowland on Aug. 15, 1972, the teachings of which are incorporated by reference herein. A method for making retroreflective sheeting is also disclosed in U.S. Pat. No. 3,689,346, issued to Rowland on Sep. 5, 1972, the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting.

SUMMARY OF THE INVENTION

The present invention is directed to a "see-through" retroreflective structure and a method for forming the same. The see-through retroreflective structure includes a transparent polymeric film, an array of retroreflective elements attached to the polymeric film, and an array of apertures through the retroreflective structure within the array of retroreflective elements. In one embodiment, the retroreflective structure includes a metalized reflective layer formed on the retroreflective elements and a support layer, such as a fabric, is attached to the metalized reflective layer. The see-through feature of the structure allows a person inside a vehicle or building to see out a window while those viewing outside can see a graphic display on the structure during the day and night.

A retroreflective structure is also provided which includes a film having a first side and a second side, a first array of retroreflective cube-corner elements attached to the first side of the film, and an array of apertures through the retroreflective structure within the array of retroreflective cube-corner elements. A second array of retroreflective cube-corner elements is attached to the second side of the film. The apertures can be formed by removing a portion of the film and the elements.

The method includes attaching an array of retroreflective elements on a transparent polymeric film. The array of retroreflective elements and the transparent polymeric film are perforated through the retroreflective structure to form an array of apertures, thereby forming a see-through retroreflective structure. In one embodiment, a metalized reflective layer can be applied to the retroreflective elements and a support layer, such as a fabric, is attached to the metalized reflective layer.

A retroreflective particle is further provided comprising a film having a first side and a second side, a first array of retroreflective cube-corner elements attached to the first side of the film, and a second array of retroreflective cube-corner elements attached to the second side of the film.

A transflector is also provided which includes a film, an array of retroreflective cube-corner elements attached to a first side of the film, an array of apertures through the retroreflective structure within the array of retroreflective cube-corner elements, and a printed sheet attached to a second side of the film. In one embodiment, the apertures are formed by removing a portion of the film and the elements. A diffuse film can be attached to the metalized reflective layer.

The present invention can be used as trim on clothing apparel, such as running suits and running shoes. In particular, the invention can display a moiré pattern. Also, the invention can be used on windows to partially retroreflect incoming light while allowing a person to partially see through the window from the other side. Further, the invention can be used as advertising display panels on windows, as reflective sun screens for windows in automobiles, etc. Furthermore, the structure is suitable for ink jet and digital printing with a whiteness background.

DETAILED DESCRIPTION OF THE INVENTION

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. All percentages and parts are by weight unless otherwise indicated.

Figures 1, 2:
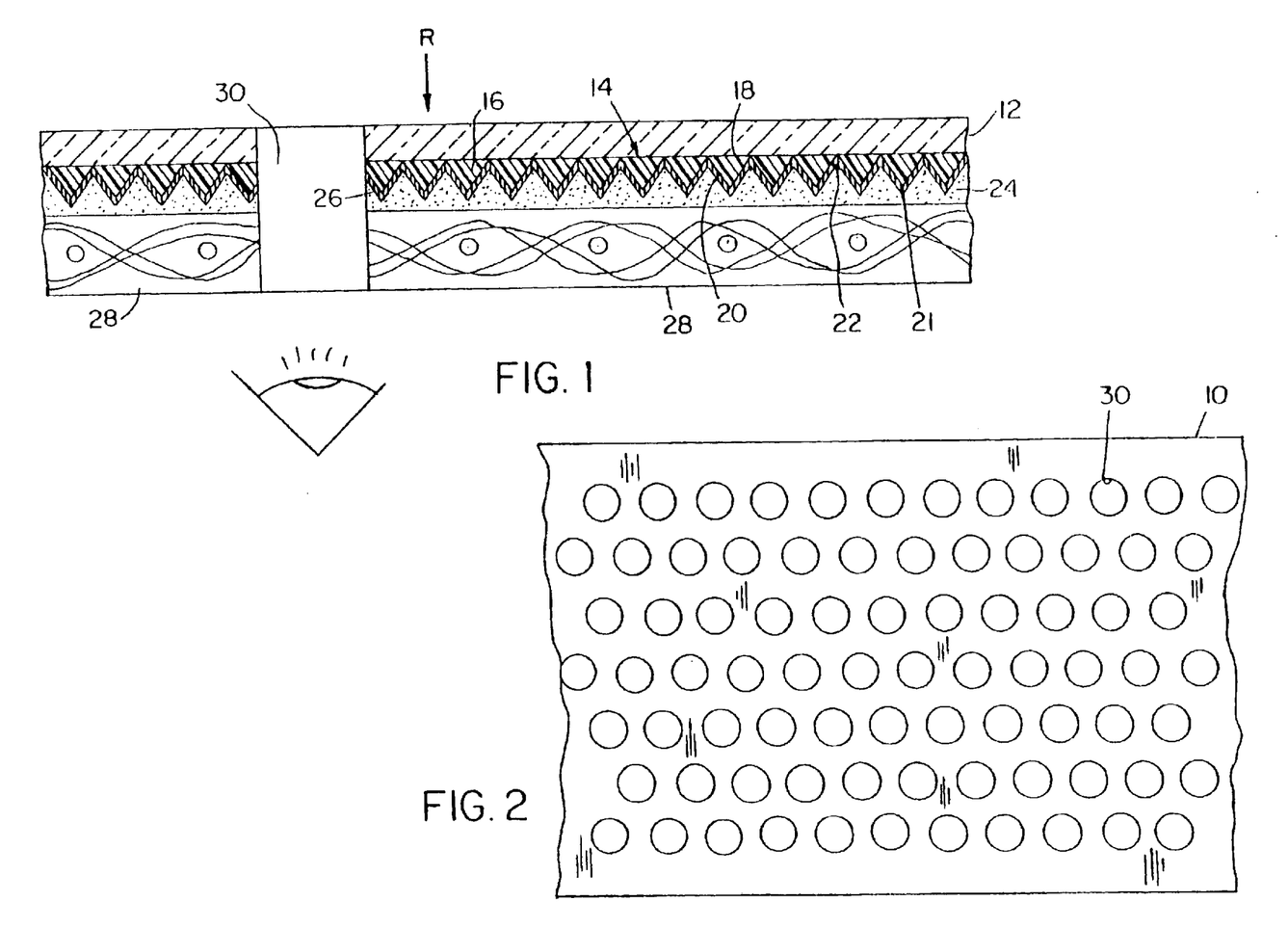
FIG. 1 is a cross-sectional view of a first embodiment of a retroreflective structure of the present invention.
FIG. 2 is a top view of the first embodiment of a retroreflective structure of the present invention.

Retroreflective structure 10, as shown in FIG. 1, has a base film 12 that is comprised of a transparent thermoplastic film, such as polyvinyl chloride, polyvinylidene chloride, urethane films, polyfluorocarbon polymers, etc. In another embodiment, the thermoplastic is an ethylene-tetrafluoroethylene copolymer. In alternative embodiments, the base film 12 can be formed from an elastic material, such as flexible polyether urethanes which perform well in laundering and flexible polyaliphatic urethanes which perform well in outdoor environments. Base film 12 is transparent to visible light and can be either clear or colored. An example of a suitable base film 12 is a polyvinyl chloride film available from Renolit Corp. under the trademark Renolit™ H1W series. Base film 12 can have a thickness in the range of between about 0.001 and 0.022 inches (0.025 and 0.56 mm). In a preferred embodiment, the thickness is in the range of between about 0.008 and 0.02 inches (0.2 and 0.51 mm). The selected thickness is dependent upon the method of fabrication, such as heating, radio high frequency welding, ultrasonic welding, the thermoplastic selected, and the characteristics desired for the retroreflective structure.

The prism array 14, which can include retroreflective cube-corner prism elements 16, is formed on the base film 12. Prism array 14 has a window side 18 exposed to incoming rays R and facet sides 20 and is attached on window side 18 to the base film 12. Prism array 14 is formed of a transparent polymer. After being formed, the polymer is preferably rigid at room temperature, which is defined as being substantially inflexible. The rigidity of the polymer in the prism array allows the prism elements to retain their optical characteristics. The prism array polymer can also be non-extensible, which is defined as not being capable of being substantially stretched without breaking. The polymer is selected from a wide variety of polymers which include the polymers of urethane, acrylic acid esters, cellulose esters, ethylenically unsaturated nitrites, hard epoxy acrylates, etc. Other polymers include polycarbonates, polyesters and polyolefins, acrylated silanes, hard polyester urethane acrylates. Other polymers which are not as rigid can also be used. These include polyvinyl chloride and polyvinylidene chloride. Preferably, the polymer is cast in a prismatic mold with a monomer or oligomer polymerization initiated by ultraviolet radiation.

The prism elements 16 of the prism array 14 can be cube-corner in shape and have a length along each cube-side edge in the range of between about 0.0015 and 0.02 inches (0.038 and 0.51 mm). In one embodiment, each cube-side edge has a length of about 0.006 inches (0.15 mm). Preferably, each cube-side edge has a length of between about 0.004 and 0.008 inches (0.1 and 0.2 mm).

The thickness of prism array 14 at valley 22, where the rigid prism elements intersect, is preferably sufficiently thin so that the prism array 14 can crack and split along the valleys 22 when a minimal force is applied to retroreflective structure 10. In one embodiment, the thickness of prism array 14, which is the distance from window side 18 to apex 21 of prisms, is in the range of between about 0.002 and 0.009 inches (0.05 and 0.23 mm).

The base film 12 provides a substrate for prism array 14 to provide a smooth surface upon which the prism elements can be attached. The window side 18 of the prism elements 16 is attached to the base film 12. The prism array 14 can be laminated to the base film 12 with a transparent adhesive. Alternatively, the prism array 14 can be cast directly onto the base film 12.

An adhesive 24 can be applied to the prism facets 20 for attaching a backing layer to the retroreflective structure. If an adhesive is employed on the prism facets, the adhesive can cause the surface of the prisms to wet, thereby destroying the air interface and eliminating the ability of the prism to retroreflect. As a result, reflective coating 26 is preferably deposited on the surface of the dihedral facets 20. Typically, the reflective coatings are formed by sputtering aluminum, silver or gold or by vacuum metalization. Alternatively, metal lacquers, dielectric coatings and other specular coating materials can be employed.

Backing layer 28 is placed on the facet side 20 of the prism array 14. The backing layer 28 can be formed of a thermoplastic. For instance, backing film 28 can be formed from a thermoplastic, such as a polyvinyl chloride, polyvinylidene chloride, urethane films, polyfluorocarbon polymers including an ethylene-tetrafluoroethylene copolymer, etc., which has a low temperature of distortion. The thermoplastic of backing layer 28 can be transparent to visible light and is either clear or colored. Alternatively, backing layer 28 can be a cloth or fabric, such as a polyester cloth. In one embodiment, the base film 12 and backing layer 28 both include polyvinyl chloride. In alternative embodiments, the backing layer 28 can be formed from an elastic material, such as flexible polyether or polyaliphatic urethanes or fabrics with built in elastic fibers, which can be formed from urethane or rubber materials. Backing layer 24 can have a thickness in the range of between about 0.005 and 0.02 inches (0.12 and 0.51 mm).

In accordance with the invention, a plurality of apertures 30 are formed in retroreflective sheeting 10 and extend through the thickness of retroreflective structure 10. The apertures are of sufficient size and spacing from one another to allow the average person to see through the otherwise opaque structure. The apertures 30 can be formed, such as by punching holes in the structure using a suitable tool of various shapes including circles, ovals, rectangles, squares, etc. Also, the apertures can be in the shape of letters or a logo. Apertures 30 can be uniformly or randomly arranged in an array on the structure. Typically, the apertures 30 can be circles having a diameter in the range of between about 0.25 and 0.75 inches (6.35 and 19.05 mm). The array of apertures can cover about 50 percent of the surface area of the retroreflective structure. The apertures provide breathability to the structure. The retroreflective structure, when superimposed over another perforated structure, can result in a moiré effect. Such configurations can be incorporated into clothing or footwear to provide a decorative pattern while providing retroreflectivity for safety.

The base film and prism array portion of one embodiment of the retroreflective structure 10 can be formed by one of the methods disclosed in U.S. Pat. No. 3,684,348, issued to Rowland on Aug. 15, 1972; U.S. Pat. No. 3,689,346, issued to Rowland on Sep. 5, 1972; U.S. Pat. No. 3,811,983, issued to Rowland on May 21, 1974; U.S. Pat. No. 3,830,682, issued to Rowland on Aug. 20, 1974; U.S. Pat. No. 3,975,083, issued to Rowland on Aug. 17, 1976; U.S. Pat. No. 4,332,847, issued to Rowland on Jun. 1, 1982; U.S. Pat. No. 4,801,193, issued to Martin on Jan. 31, 1989; U.S. Pat. No. 5,229,882, issued to Rowland on Jul. 20, 1993; U.S. Pat. No. 5,236,751, issued to Martin et al. on Aug. 17, 1993; U.S. Pat. No. 5,264,063, issued to Martin on Nov. 23, 1992; U.S. Pat. No. 5,376,431, issued to Rowland on Dec. 27, 1994; U.S. Pat. No. 5,491,586, issued to Phillips on Feb. 13, 1996; U.S. Pat. No. 5,512,219, issued to Rowland on Apr. 30, 1996; U.S. Pat. No. 5,558,740, issued to Bernard et al. on Sep. 24, 1996; U.S. Pat. No. 5,592,330, issued to Bernard on Jan. 7, 1997; and U.S. Pat. No. 5,637,173, issued to Martin et al. on Jun. 10, 1997. The teachings of each patent are incorporated herein by reference.

In one embodiment, a six mil (0.15 mm) polyvinyl chloride film is laminated to a two mil (0.05 mm) polyethylene terepthalate (PET) carrier. The polyvinyl chloride film is tie coated and retroreflective prisms are cast on the tie coated polyvinyl chloride film. The retroreflective prisms are metalized. The metalized layer may or may not need to be protected by a coating of some type depending on the application requirements. In embodiments where a silver appearance of metalization is not preferred, a color (either the same color as the top surface or another) can be printed or coated on the metalized layer. A top view of the retroreflective structure is shown in FIG. 2.

Figures 3, 4:
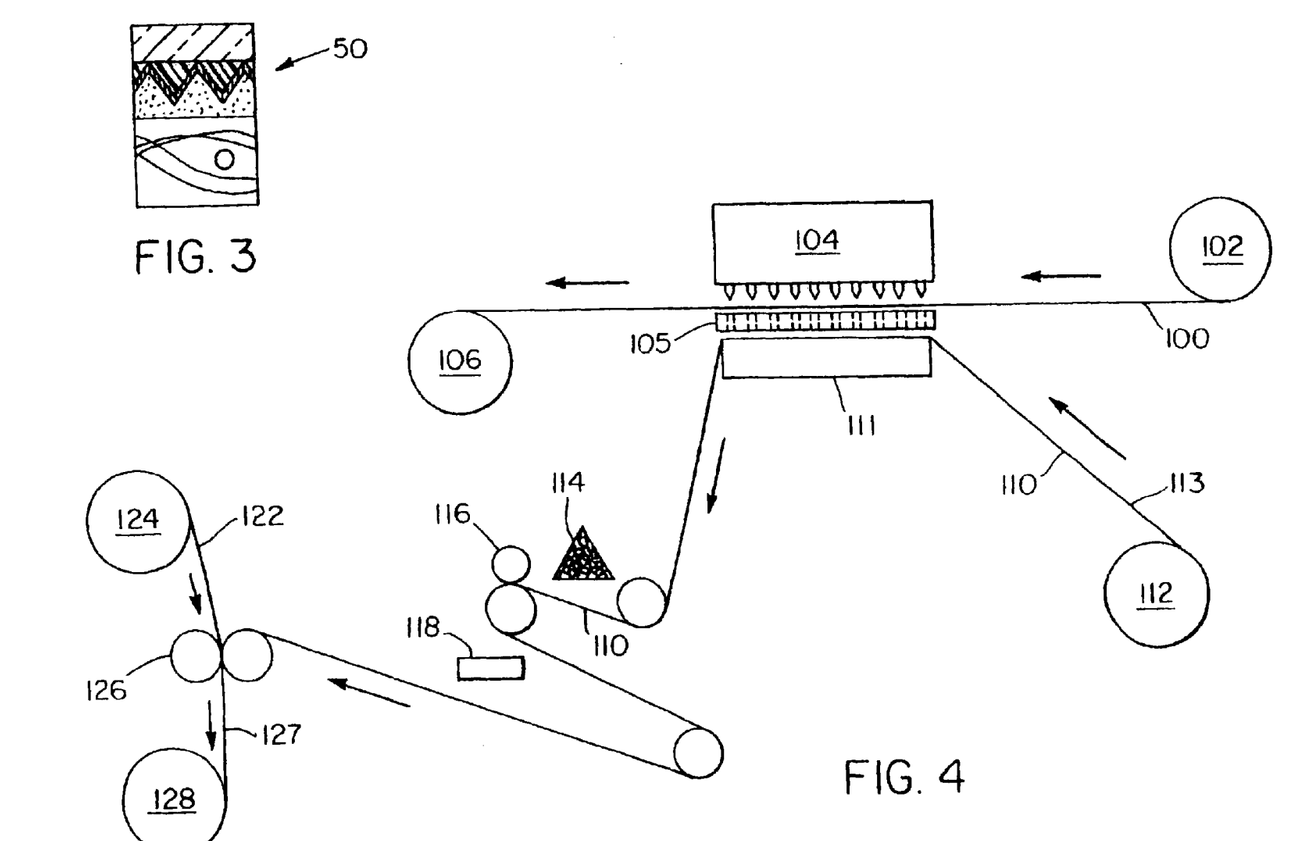
FIG. 3 is a cross-sectional view of a second embodiment of the retroreflective structure of the present invention.
FIG. 4 is a schematic diagram of a second embodiment of the method for forming the invention.

Referring now to FIG. 4, a preferred method of forming the invention will now be described in further detail. A metalized retroreflective structure film 100, formed as described above, is unwound from roll 102 and directed to a device 104, such as a step and repeat die punch system, for punching apertures in retroreflective structure film 100. The metalized retroreflective structure film 100 is wound up at windup station 106. The punched particles 50 of retroreflective film described in detail above and shown in FIG. 3 drop onto auto platen 105 and are collected from platen 105. Alternatively, as shown in FIG. 4, the particles 50 can be directly applied from device 104 to an adhesive coated substrate 110, such as a fabric, which is unwound from fabric roll 112, as shown in FIG. 4. Particles 50 can also be dispersed onto the adhesive side 113 of the adhesive coated substrate 110 from particle dispenser 114. Pinch rollers 116 press the particles against adhesive coated substrate 110. Any loose particles are caught in tray 118 as the adhesive coated substrate and particles exit pinch rollers 116. Top film 122 is unrolled from top film roller 124 and is laminated to adhesive coated substrate with particles in between the two layers by laminating rollers 126. The laminated structure 127 is wound up on windup roller 128.

The particles are suitable for use as decorative or conspicuity particles on clothing, T-shirt signs, pavement marking lines, traffic signs, bicycle helmets, tarpaulins, etc. The particles can be mixed in a gel and applied to a substrate.

For use in low temperature processes (below the melting temperature of PET or polyvinyl chloride), the particles stay intact within the plastic substrate during lamination. For use where the polymer processing temperature exceeds the melting point of PET, the film deforms but the thermoset prisms and/or reflective coating remains intact.

Figure 5:
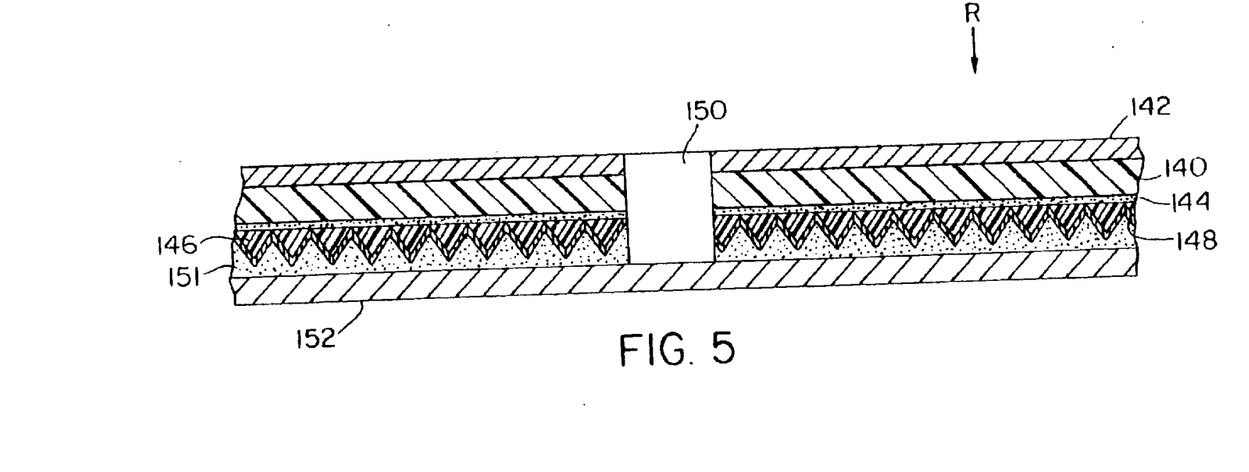
FIG. 5 is a cross-sectional view of a method for forming an alternative retroreflective structure at a first point in forming a third embodiment of the present invention.
Figure 6:
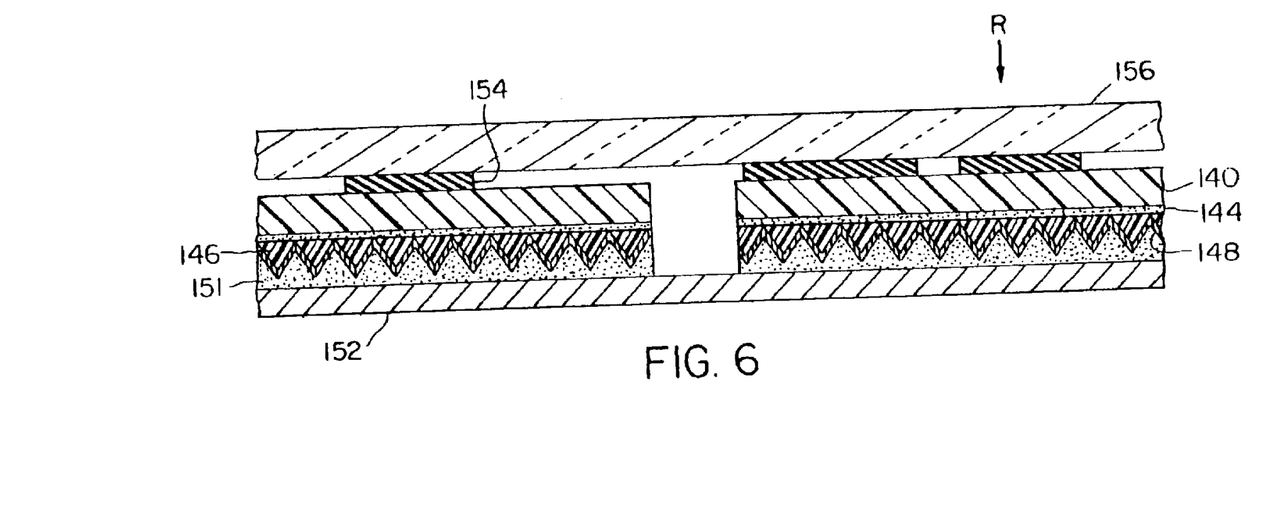
FIG. 6 is a cross-sectional view of a method for forming an alternative retroreflective structure at a second point in forming the third embodiment of the present invention.

In another embodiment, the perforated retroreflective structure can be applied to the inside of a window. Shown in FIG. 5, polyvinyl film 140 is laminated to a carrier film 142, and the polyvinyl film 140 is coated with tie coat 144. Prisms 146 are cast on the tie coat 144 and the prisms are silver metalized. The structure is perforated with a stamping device to form aperture 150. A barrier film 152, such as paper or polypropylene, is added to the metalized side 148 with an adhesive 151 to provide dimensional stiffness and allows the film to be ink jet printed. Shown in FIG. 6, the carrier film is removed and the polyvinyl film is either screen printed or ink jet printed using plasticol inks 154. By using such inks, the surface of the polyvinyl film 140 has a static cling property, thereby allowing the structure to be applied on the inside of a window 156. Screen printing is a preferred embodiment for long runs or ultraviolet light resistant applications. In another embodiment, a PET film can be used for the top layer for printing on. In yet another embodiment, a dye receptive film can be formed on or attached to the polyvinyl film 140 for reception of inks and the like.

Figure 7:
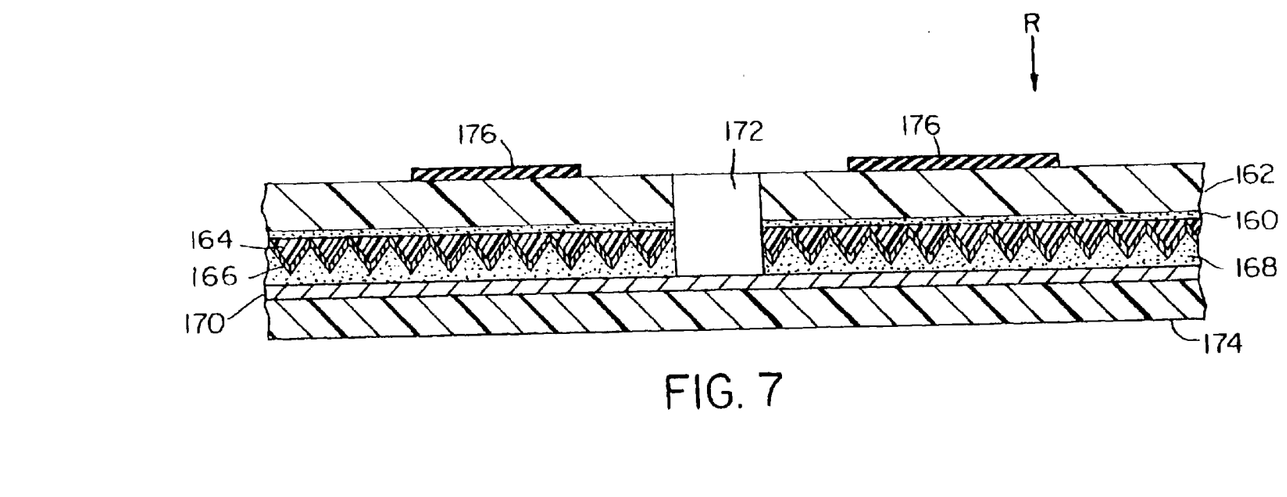
FIG. 7 is a cross-sectional view of a method for forming an alternative retroreflective structure at a first point in forming a fourth embodiment of the present invention.
Figure 8:
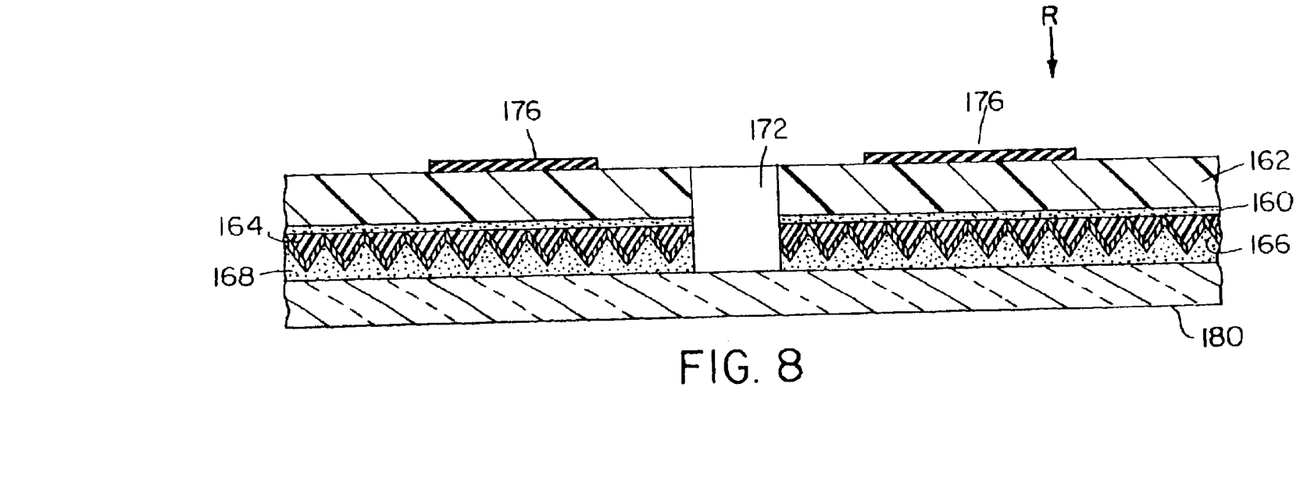
FIG. 8 is a cross-sectional view of a method for forming an alternative retroreflective structure at a second point in forming the fourth embodiment of the present invention.

The perforated retroreflective structure can be applied to the outside of a window. Shown in FIG. 7, a method for forming the structure includes applying a tie coat 160 to PET film 162. Prisms 164 are cast on the tie coat 160 and then metalized to form metalized layer 166. The metalized prisms are coated with a removable acrylic-based adhesive 168, preferably with a black pigment incorporated therein, and a silicone coated paper release liner is applied to the acrylic-based adhesive. The film is perforated with a perforator to form aperture 172. A barrier film 174, such as paper or polypropylene, is attached to the release liner 170 to provide additional dimensional stiffness. The film can then be printed on the exposed PET side with screening 176, ink jet printing or another suitable method. Ink jet printers can be a pigmented solvent system that can offer ultraviolet light resistance for about twelve months. As shown in FIG. 8, the temporary release liner 170 is removed and the retroreflective structure can be attached to the outside of a window 180.

Figures 9, 10:
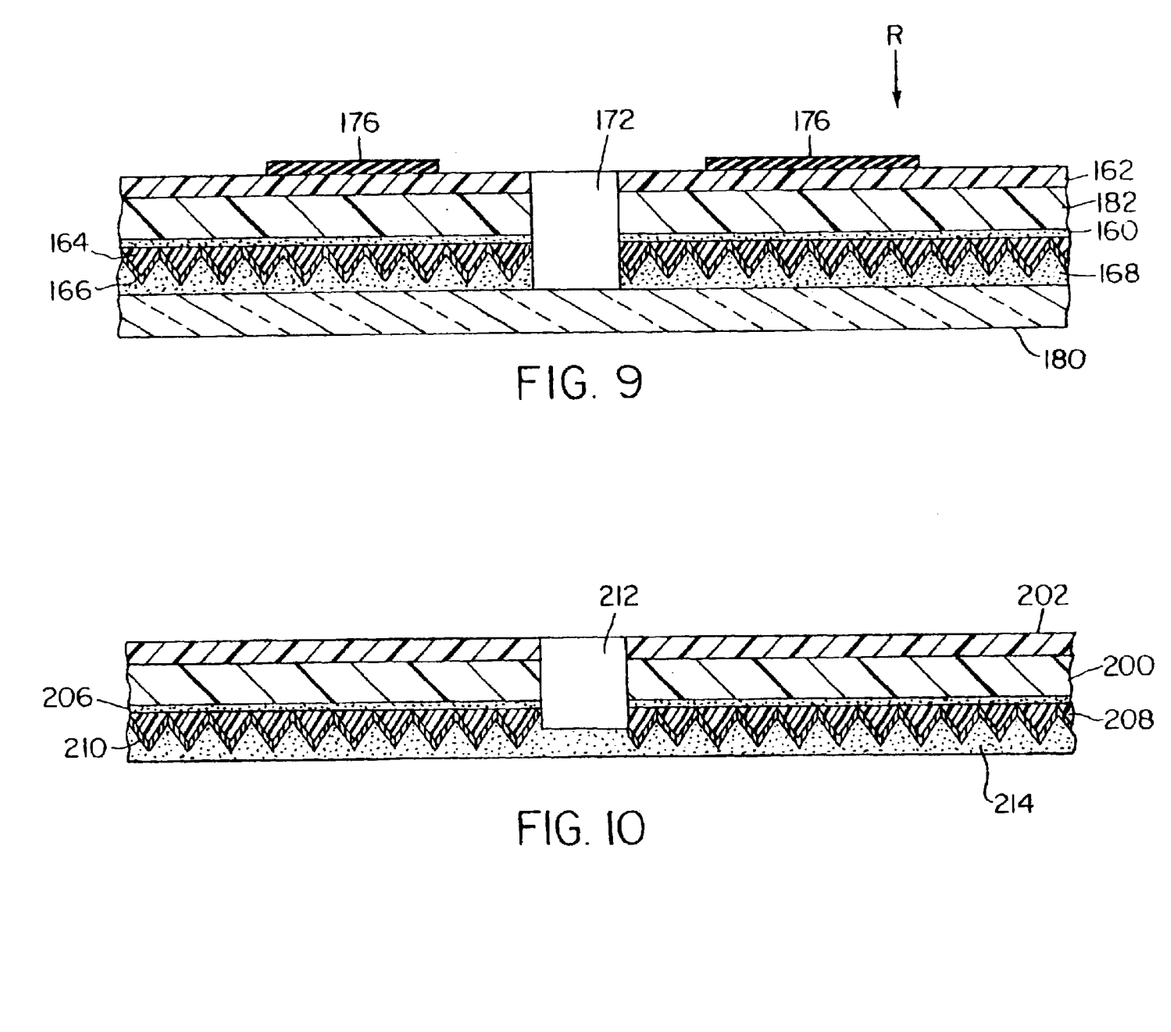
FIG. 9 is a cross-sectional view of a method for forming an alternative retroreflective structure at a point in forming a fifth embodiment of the present invention.
FIG. 10 is a cross-sectional view of a method for forming an alternative retroreflective structure at a point in forming a sixth embodiment of the present invention.

In another embodiment, shown in FIG. 9, a polyvinyl film can be laminated to a carrier film, such as a two mil (0.05 mm) PET film 162, and then the polyvinyl film 182 is tie coated. Retroreflective prism elements are cast on the tie coat 160 and then are metalized. The metalized prisms are coated and the carrier film is printed on by a similar step as discussed in the prior paragraph. The structure can be applied to the outside of a window.

Figure 11:
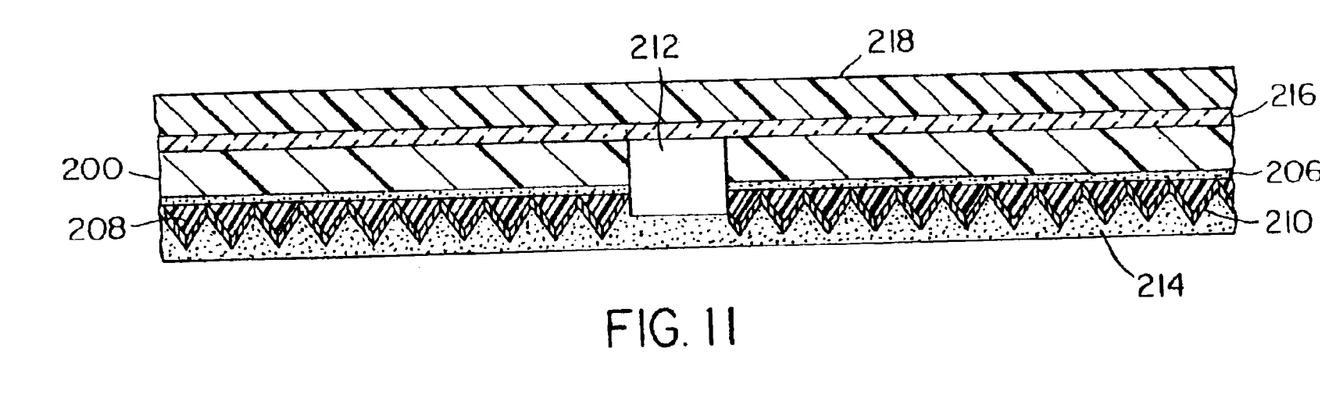
FIG. 11 is a cross-sectional view of a method for forming an alternative retroreflective structure at a second point in forming the sixth embodiment of the present invention.

A transflector material for use in airport signs is typically back lit, but it needs to be retroreflective in the event of a power outage. In one embodiment, the transflector material, shown in FIG. 10, is formed by laminating a polyvinyl film 200 to a carrier film 202, such as PET, and the polyvinyl film is coated with a tie coat 206. Prisms 208 are cast on the tie coat 206. The prisms 208 are metalized with metal layer 210. The film is perforated to form apertures 212. The perforated film is laminated to a white diffuse film 214. Shown in FIG. 11, the carrier film is then removed from the vinyl film. A transparent adhesive 216 is applied to the polyvinyl film, and the film is applied to a silk screen-type printed sheet 218 of transparent material for use in a sign. The printed sheet 218 can be formed from polyvinyl chloride, polymethyl methacrylate (PMMA), or other suitable materials. A coating can be provided over the printed sheet 218 for purposes such as preventing abrasions to the printed sheet.

Figure 12:
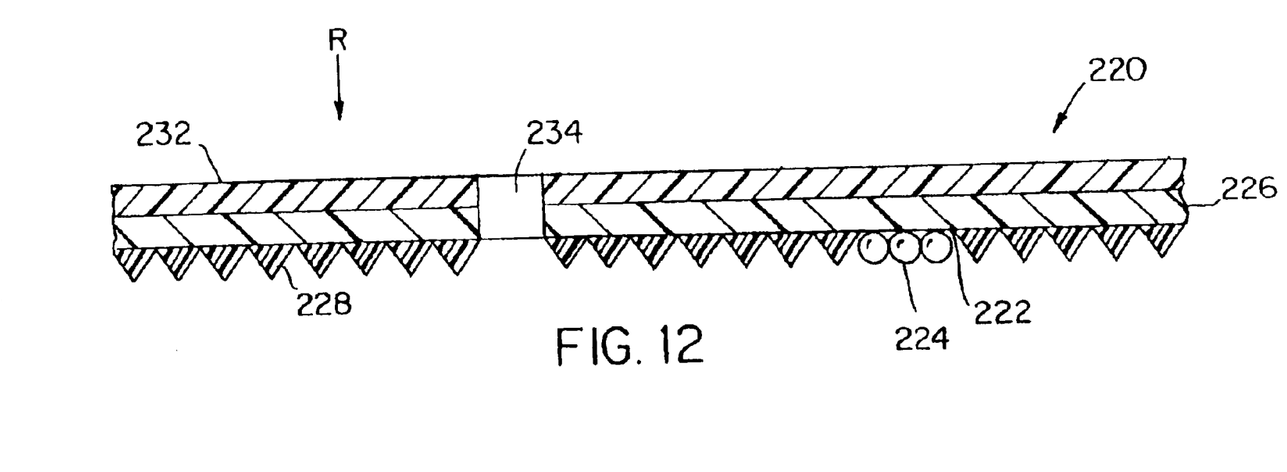
FIG. 12 is a cross-sectional view of a method for forming an alternative retroreflective structure at a first point in forming a seventh embodiment of the present invention.
Figure 13:
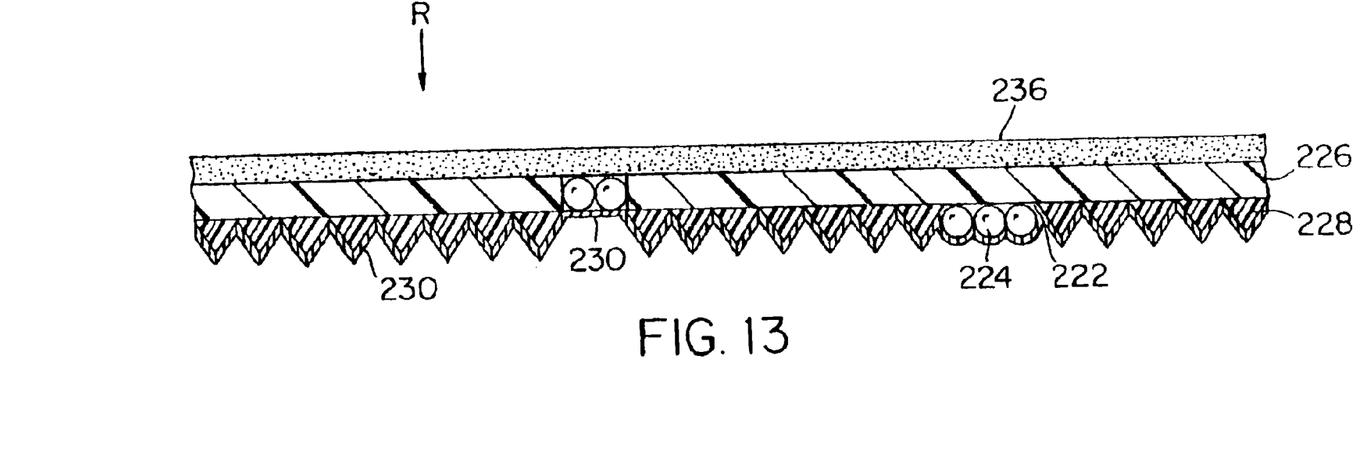
FIG. 13 is a cross-sectional view of a method for forming an alternative retroreflective structure at a second point in forming the seventh embodiment of the present invention.

A seamless graphic film 220, as shown in FIG. 12, can be formed to hide or remove seam lines created by a mold. The seam lines 222 are removed by cutting out as much of the seam lines as possible and replacing them with glass beads 224. A polyvinyl prismatic internal reflective element film 226 with prisms 228 laminated with a PET carrier film 232 is perforated to form apertures 234. The PET carrier film 232 is removed from the perforated vinyl prismatic film 226. The perforated retroreflective prismatic film 226 is coated with a light tack removable adhesive so that the reflective surface (window surface) is in contact with the adhesive. Beads 224, preferably high refractive index glass beads, are coated on the film 220. In FIG. 13, the beads 224 attach where the beads are exposed to the adhesive 236 in the apertures 234 of the vinyl prismatic film 220. The facets of the prisms 228 and the attached beads are metalized with metalized layer 230. In another embodiment, metalized one or two sided corner cube chips or particles may be bonded to the exposed adhesive to provide additional retroreflective area, glitter effects, and/or color effects. The particles can also include metalized "open-face" cube-corner prisms, such as taught in U.S. application Ser. No. 09/488,129, filed Jan. 20, 2000, the teachings of which are incorporated herein by reference. The corner cubes may be of a different size than the corner cubes formed on the film 226.

Figure 14:
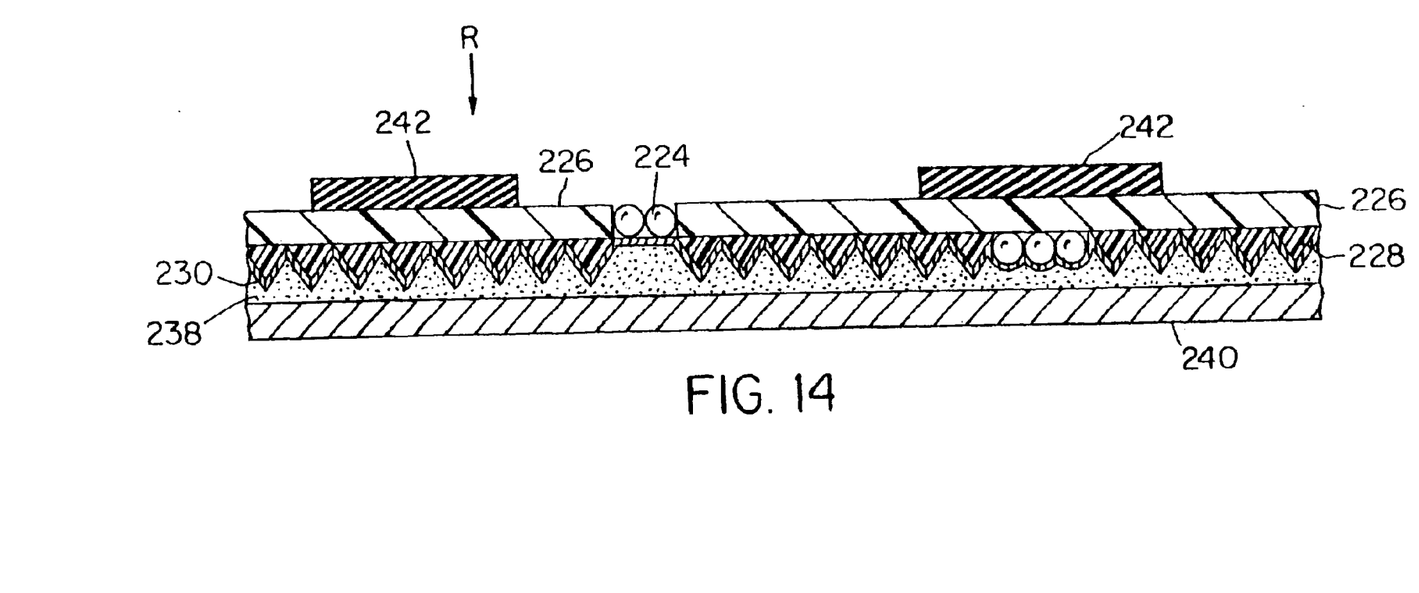
FIG. 14 is a cross-sectional view of a method for forming an alternative retroreflective structure at a third point in forming the seventh embodiment of the present invention.

As shown in FIG. 14, base adhesive 238, preferably a white adhesive, and a backing film 240 are applied to the metalized layer 230. The low-tack adhesive 236 is removed and the film is coated with a flexible transparent weatherable ink receptive system 242. The formed structure provides a balanced set of properties with good narrow observation for long distance sight detection and with good angularity for viewing at short distances.

Figure 15:
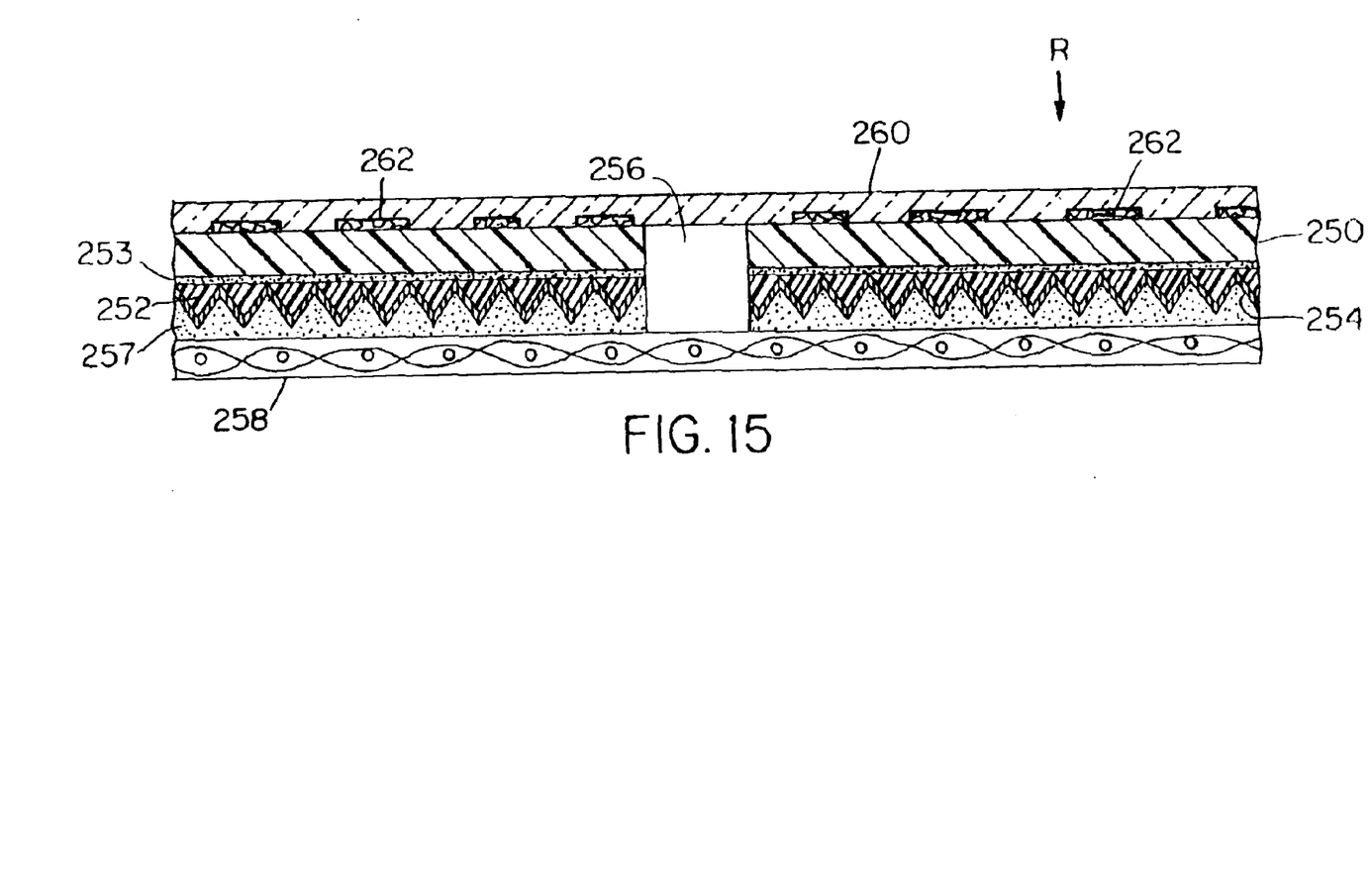
FIG. 15 is a cross-sectional view of a method for forming an alternative retroreflective structure at a point in forming an eighth embodiment of the present invention.

In another embodiment, as shown in FIG. 15, a flexible film 250 having prisms 252 cast on a tie coat 253 and metalized layer 254 on the facets of the prisms is perforated to form apertures 256. The perforated film is laminated using an adhesive 257 to a fabric-backed material 258. The film is then extrusion coated with a clear abrasion and ultraviolet light resistant material 260, such as polyvinyl chloride or polyurethane. In another embodiment, prior to lamination, colored PET glitter pieces 262 are coated onto the surface of perforated film which attaches to the areas where the adhesive is present in the perforations to provide a partially glitter-coated perforated reflective film.

Often white ultraviolet curable ink, either on the facets of the prisms or in the tie coat on the window side of the prisms, is used to achieve the necessary Cap Y to meet industry whiteness specifications. While the white printing enhances the Cap Y performance, it also destroys the retroreflectivity of the prisms it covers, thereby effectively destroying sometimes about thirty percent of the retroreflectivity. The white printing can be in the form of a logo, lettering, etc. In addition, the step of printing can expose the prismatic film to excessive heat which can negatively impact the resulting retroreflectivity. Further, printing on the tie coat reduces the run speeds because of the difficulty in curing the prisms.

Figure 16:
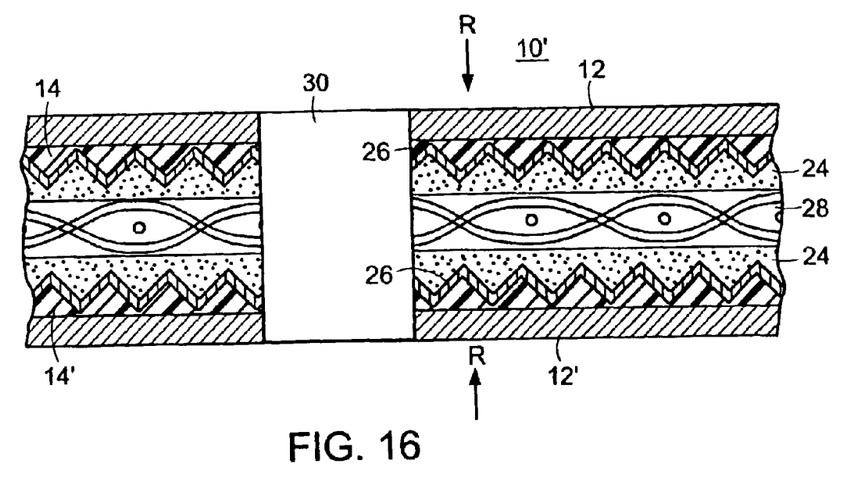
FIG. 16 is a cross-sectional view of another embodiment of a retroreflective structure of the present invention.
Figure 17:
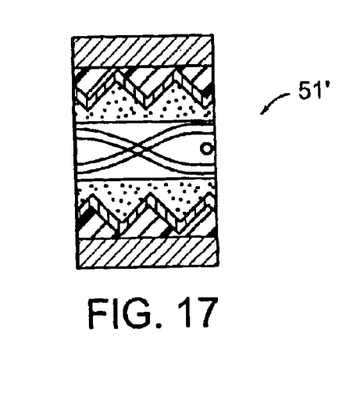
FIG. 17 is a cross-sectional view of yet another embodiment of the retroreflective structure of the present invention.

FIG. 16 illustrates another embodiment of a retroreflective structure 10' in accordance with the invention. This embodiment is similar to the embodiment of FIG. 1 but further includes a second prism array 14', which is formed on the base film 12', attached to a second side of the layer 28. Thus, light rays R are retroreflected from both sides of the structure 10'. As in other embodiments, a plurality of apertures 30 are formed in the retroreflective sheeting 10'. The punched particles 51' from apertures 30, as shown in FIG. 17, can be used for decorative or conspicuity purposes.

Figure 18:
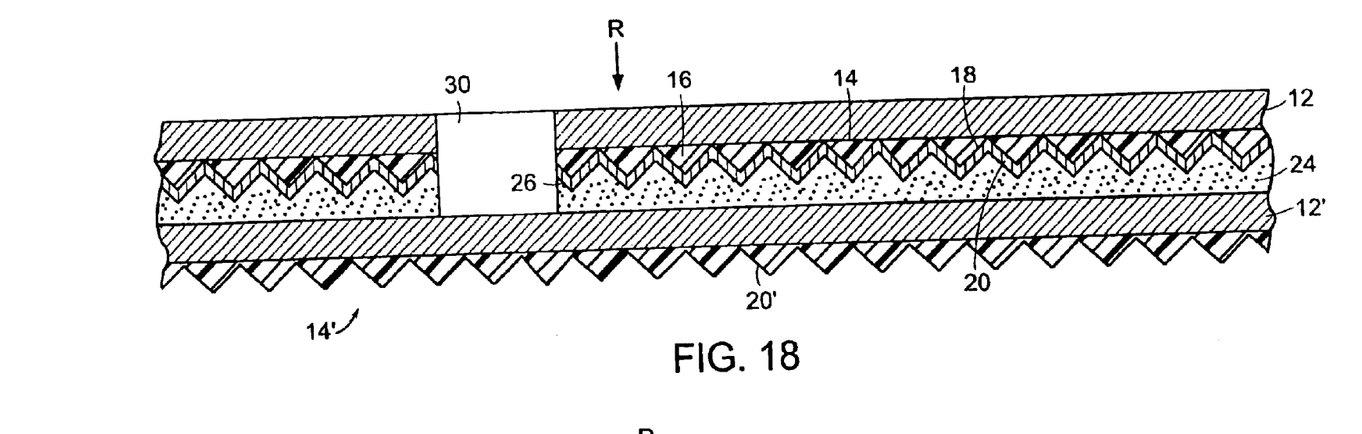
FIG. 18 is a cross-sectional view of another embodiment of the retroreflective structure of the present invention.
Figure 19:
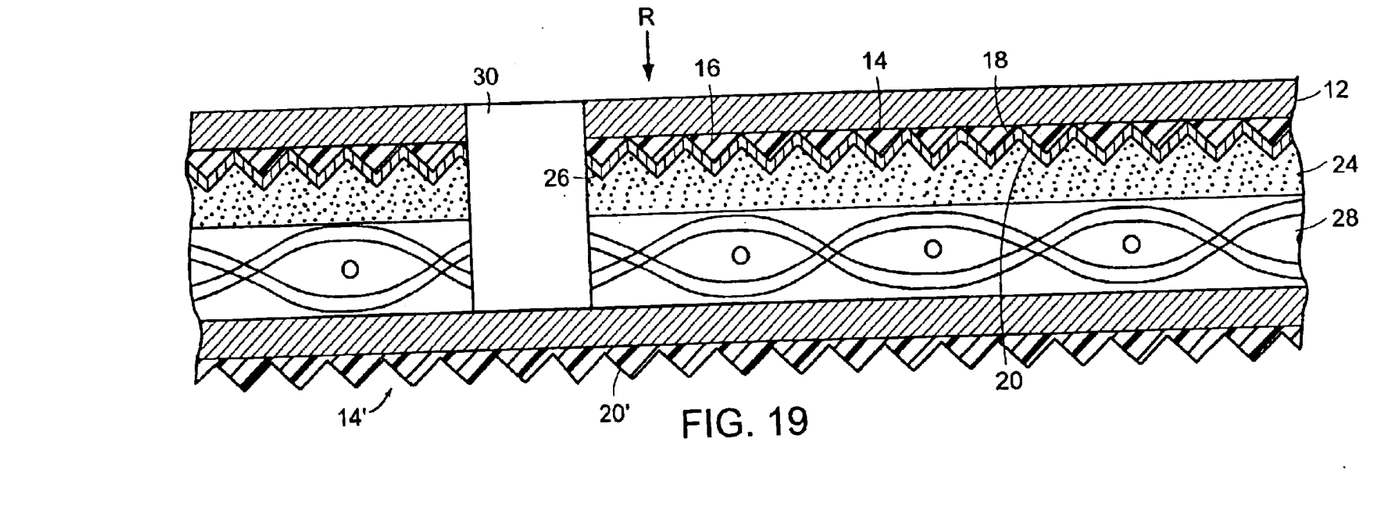
FIG. 19 is a cross-sectional view of yet another embodiment of the retroreflective structure of the present invention.

FIG. 18 illustrate another embodiment of a retroreflective structure which includes a second base film 12' having a prism array 14'. This arrangement provides additional retroreflectivity in the aperture 30 area. The prism array 14' can further include a reflective coating deposited on the surface of the dihedral facets 20'. Further, backing layer 28 can be attached to the prism area 14'. FIG. 19 is similar to FIG. 18 and further includes backing layer 28 disposed between the prism arrays 14 and 14'.

Figure 20:
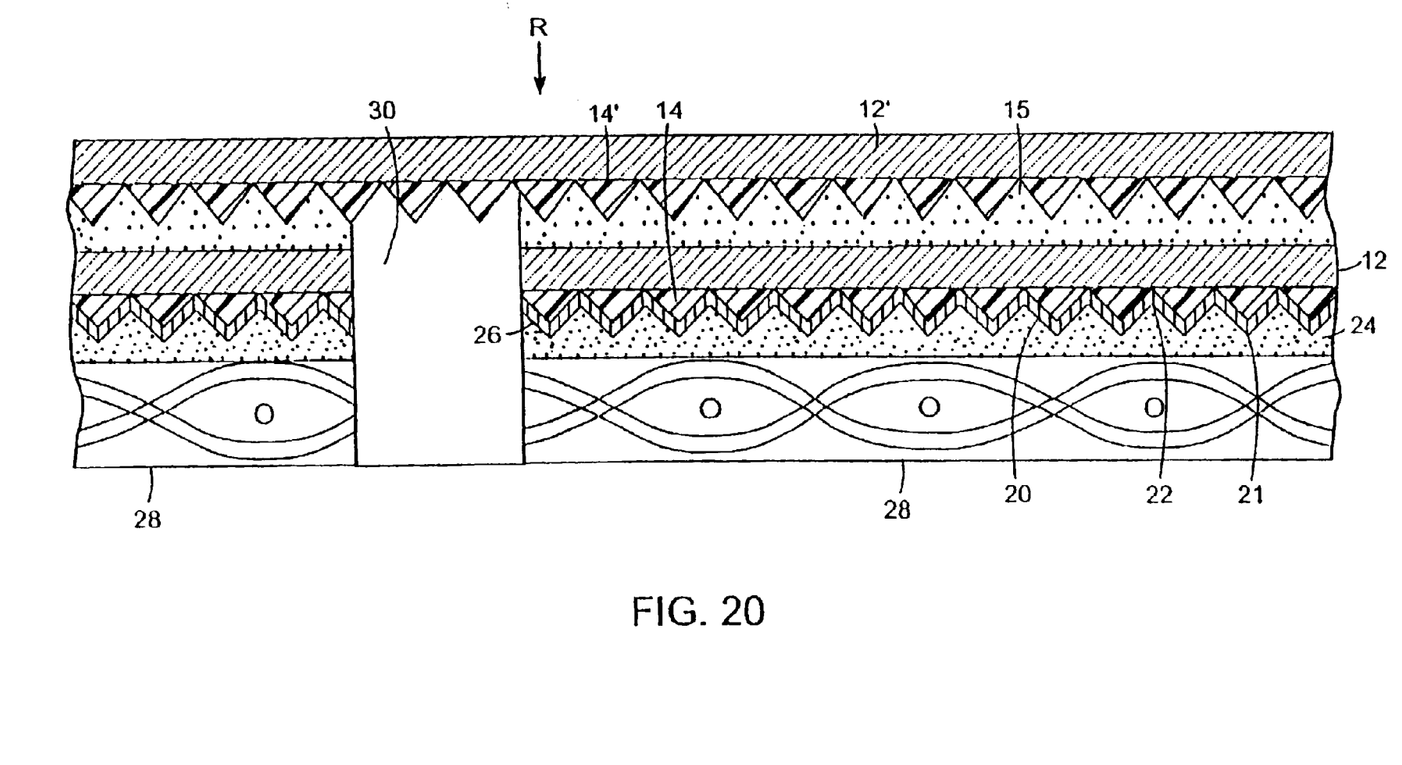
FIG. 20 is a cross-sectional view of a further embodiment of the retroreflective structure of the present invention.

FIG. 20 illustrates a further embodiment of a retroreflective structure in which the prism array 14' and base film 12' as disposed on the top side of the film. In one embodiment, the prism array 14' is bonded to the base film 12 by a substantially clear adhesive 15. The prisms suspended over the apertures 30 are air-backed and provide retroreflection at the apertures. The remaining prisms are "wetted-out" by the adhesive 15 and do not provide retroreflection.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A retroreflective structure, comprising:
    a film having an array of retroreflective cube-corner elements attached thereto;
    an array of apertures through the retroreflective structure within the array of retroreflective cube-corner elements, the apertures formed by removing a portion of the film and the elements; and
    a material disposed adjacent to the array of retroreflective cube-corner elements.

2. The retroreflective structure of claim 1, wherein the retroreflective cube-corner elements have a metalized reflective layer disposed thereon.

3. The retroreflective structure of claim 1, wherein the material includes a fabric-backed material.

4. The retroreflective structure of claim 1, wherein the material is attached to a metalized layer disposed on the retroreflective cube-corner elements with an adhesive.

5. The retroreflective structure of claim 1, further comprising glitter pieces to provide a partially glitter-coated perforated retroreflective structure.

6. The retroreflective structure of claim 1, further comprising a material adjacent to the film.

7. The retroreflective structure of claim 6, further comprising a plurality of glitter pieces disposed between the material disposed adjacent to the array of retroreflective cube-corner elements and the material adjacent to the film.

8. The retroreflective structure of claim 7, wherein the glitter pieces are colored.

9. The retroreflective structure of claim 1, further comprising a plurality of glitter pieces disposed within the array of apertures.

10. The retroreflective structure of claim 1, wherein the film is colored.

11. The retroreflective structure of claim 1, wherein the material is colored.

12. The retroreflective structure of claim 1, wherein the material covers substantially all of the array of apertures.

13. A retroreflective structure, comprising:
    an array of apertures formed within a film having an array of retroreflective cube-corner elements attached thereto; and
    a material disposed adjacent to the cube-corner elements.

14. The retroreflective structure of claim 13, further comprising a metalized layer disposed between the cube-corner elements and the material.

15. The retroreflective structure of claim 13, further comprising a plurality of glitter pieces.

16. The retroreflective structure of claim 15, wherein the glitter pieces are colored.

17. The retroreflective structure of claim 13, further comprising a top film disposed over substantially all of the array of apertures to cover the same.

18. A method for forming a retroreflective structure, comprising:
    providing a film having an array of retroreflective cube-corner elements attached thereto;
    forming an array of apertures through the retroreflective structure within the array of retroreflective cube-corner elements, the apertures formed by removing a portion of the film and the elements; and
    providing a material adjacent to the array of retroreflective cube-corner elements.

19. The method of claim 18, wherein the material covers substantially all of the array of apertures.

20. The method of claim 19, further comprising providing a metalized reflective layer on the array of retroreflective cube-corner elements.

21. The method of claim 18, further comprising providing a plurality of glitter pieces within the array of apertures.

22. The method of claim 18, further comprising providing a top film adjacent to the film.

23. The method of claim 22, further comprising providing glitter pieces between the top film and the film having an array of retroreflective cube-corner elements attached thereto.

24. A method for forming a retroreflective structure, comprising:
    forming an array of apertures within a film having an array of retroreflective cube-corner elements attached thereto; and
    providing a material adjacent to the cube-corner elements.

25. The method of claim 24, further comprising providing a metalized layer between the cube-corner elements and the material.

26. The method of claim 24, further comprising providing a top film over substantially all of the array of apertures.

27. A strip of retroreflective sheeting attached to a fabric forming a region, wherein within the region, at least a portion of the sheeting is not present, wherein apertures formed by removing a portion of the retroreflective sheeting and the fabric are provided in the region.

28. The strip of claim 27, wherein the strip of retroreflective sheeting covers about 50 percent of the region.

29. The strip of claim 27, wherein the portion of the sheeting not having the sheeting present is between about 25 and 75 percent of the region.

30. The strip of claim 27, wherein the portion of the sheeting not having the sheeting present provides breathability to the fabric.

31. Retroreflective sheeting comprising retroreflective regions and non-retroreflective regions within a region, the sheeting including an array of apertures formed by removing a portion of the retroreflective regions.

32. The retroreflective sheeting of claim 31, wherein the non-retroreflective regions provide breathability to the sheeting.

33. The retroreflective sheeting of claim 31, wherein the non-retroreflective regions comprise about 50 percent of the region.

34. A region on a fabric, the region including a plurality of retroreflective areas and a plurality of non-retroreflective areas, the region including an array of apertures formed by removing a portion of the retroreflective areas and fabric.

35. The region of claim 34, wherein the non-retroreflective areas comprise between about 25 and 75 percent of the region.

36. A method for providing a region on a fabric, comprising providing retroreflective sheeting on the fabric at the region, wherein the region includes retroreflective portions and non-retroreflective areas, the method further comprising forming an array of apertures within the retroreflective portions and fabric.

* * * * *